US008340649B2

(12) United States Patent
Ringland et al.

(10) Patent No.: US 8,340,649 B2
(45) Date of Patent: Dec. 25, 2012

(54) ESTABLISHING COMMUNICATIONS SESSIONS

(75) Inventors: Simon P A Ringland, Suffolk (GB); Francis J Scahill, Suffolk (GB)

(73) Assignee: British Telecommunications public limited company, London (GB)

( * ) Notice: Subject to any disclaimer, the term of this patent is extended or adjusted under 35 U.S.C. 154(b) by 1352 days.

(21) Appl. No.: 11/885,738

(22) PCT Filed: Feb. 27, 2006

(86) PCT No.: PCT/GB2006/000688
§ 371 (c)(1), (2), (4) Date: Sep. 6, 2007

(87) PCT Pub. No.: WO2006/095135
PCT Pub. Date: Sep. 14, 2006

(65) Prior Publication Data
US 2008/0139186 A1 Jun. 12, 2008

(30) Foreign Application Priority Data
Mar. 11, 2005 (EP) .................................. 05251470

(51) Int. Cl.
*H04M 3/00* (2006.01)
(52) U.S. Cl. ................... 455/418; 379/142.01; 379/188; 379/189; 379/211.01; 379/201.01; 455/433; 455/456.1; 455/403; 455/404.2; 455/414.1; 455/445; 455/466; 455/412; 455/415; 370/335; 370/310; 370/230
(58) Field of Classification Search ................. 370/335, 370/310, 230; 379/142.01, 188, 189, 211.01, 379/201.01; 455/445, 466, 412, 415, 8, 433, 455/456.1, 403, 404.2, 414.1
See application file for complete search history.

(56) References Cited

U.S. PATENT DOCUMENTS

| 5,841,837 A | 11/1998 | Fuller et al. | |
|---|---|---|---|
| 5,956,717 A * | 9/1999 | Kraay et al. ........................ | 1/1 |
| 2003/0032410 A1 | 2/2003 | Saraswat | |
| 2004/0266415 A1* | 12/2004 | Belkin et al. .................. | 455/415 |
| 2004/0266426 A1* | 12/2004 | Marsh et al. ............... | 455/426.2 |
| 2005/0058067 A1* | 3/2005 | Chmaytelli et al. .......... | 370/230 |

(Continued)

FOREIGN PATENT DOCUMENTS
EP 10 89 584 4/2001
(Continued)

OTHER PUBLICATIONS
International Search Report EP 05 25 1470.
(Continued)

*Primary Examiner* — Joseph Arevalo
(74) *Attorney, Agent, or Firm* — Nixon & Vanderhye P.C.

(57) ABSTRACT

A method of establishing a communications session in a communications system is disclosed. The communications system comprises a caller terminal (103), a mobile terminal (101) associated with the caller terminal (103), a callee terminal (115) associated with a callee and session initiation means (111,113). It has become common yet frustrating for users to have to maintain contact lists on a multiplicity of communications devices (e.g. the caller terminal and the mobile terminal). The method comprises: (i) identifying the callee using the mobile telephone (101); (ii) responsive to identification of said callee, transferring data identifying the callee from the mobile terminal (101) to the session initiation means (111,113); and (iii) in dependence on the transferred data, operating the session initiation means (111,113) to establish a communications session between the caller terminal (103) and the callee terminal (115).

14 Claims, 11 Drawing Sheets

U.S. PATENT DOCUMENTS

| | | | |
|---|---|---|---|
| 2005/0237978 A1* | 10/2005 | Segal | 370/331 |
| 2005/0243982 A1* | 11/2005 | Starbuck et al. | 379/88.23 |
| 2006/0025141 A1* | 2/2006 | Marsh et al. | 455/445 |
| 2006/0062190 A1* | 3/2006 | Suga | 370/338 |
| 2006/0072726 A1* | 4/2006 | Klein et al. | 379/201.01 |
| 2006/0115063 A1* | 6/2006 | Givargis | 379/142.01 |
| 2006/0135157 A1* | 6/2006 | Baek et al. | 455/433 |
| 2006/0177030 A1* | 8/2006 | Rajagopalan et al. | 379/142.07 |
| 2007/0140176 A1* | 6/2007 | Bachenberg | 370/335 |

FOREIGN PATENT DOCUMENTS

EP      1 372 327 A      12/2003

OTHER PUBLICATIONS

International Search Report PCT/GB2006/000688.
Sandord, Matt, "Vonage-Click2call" CPAN, Mar. 7, 2005, pp. 1-5, XP002339491, https://secure.click2callu.com.

* cited by examiner

ESTABLISHING COMMUNICATIONS SESSIONS

This application is the US national phase of international application PCT/GB2006/000688 filed 27 Feb. 2006 which designated the U.S. and claims benefit of EP 05251470.0, dated 11 Mar. 2005, the entire content of which is hereby incorporated by reference.

This invention relates to a method of and an apparatus for establishing a communications session in a communications system.

A common frustration for users of present communications devices is the maintenance of contacts lists on a multiplicity of such devices. For example, a user might have a mobile telephone, one or more fixed line, cordless telephones and/or one or more fixed line, corded telephones, each of which has the capacity to store its own independent contacts list.

It is known for the contacts list stored in the subscriber identity module (SIM) card of a mobile telephone to be made available for use in establishing a telephone call on a fixed line telephone. For example, the Equinox 1200 digital cordless (DECT) telephone available from British Telecommunications plc has a SIM card reader. By temporarily removing the SIM card from a mobile telephone handset and plugging it into the Equinox 1200 handset, the contacts list stored on the SIM card can be copied into the Equinox 1200 handset after which the SIM card can be returned to the mobile telephone handset. The contact list is then available for use in establishing calls on the Equinox 1200 handset. However, if the contact list on the SIM card is modified, this process must be repeated in order to enable the updated contacts list to be used on the fixed line handset.

According to a first aspect of the present invention there is provided a method of establishing a communications session in a communications system, said communications system comprising a caller terminal, a mobile terminal associated with said caller terminal, a callee terminal associated with a callee and session initiation means, said method comprising:
  (i) identifying said callee using said mobile terminal;
  (ii) responsive to identification of said callee, transferring data identifying said callee from said mobile terminal to said session initiation means; and
  (iii) in dependence on said transferred data, operating said session initiation means to establish a communications session between said caller terminal and said callee terminal.

According to a second aspect of the present invention, there is provided communication session initiation apparatus for establishing a communications session in a communications system, said communications system comprising a caller terminal, a mobile terminal associated with said caller terminal, and a callee terminal associated with a callee, said apparatus comprising:
  data receiving means arranged in operation to receive from said mobile terminal, data identifying said callee; and
  session establishment means arranged in operation to establish a communications session between said caller terminal and said callee terminal responsive to and in dependence on said received data.

By using a mobile terminal associated with a caller terminal to identify a callee; and in response to the identification of the callee transferring data identifying the callee from the mobile terminal to session initiation means; and in dependence on the transferred data operating the session initiation means to establish a communications session between the caller terminal and a callee terminal associated with the callee, a mobile terminal can be used to establish a communications session on a caller terminal not having the necessary contact information and without the need to synchronise any contact databases associated with the mobile terminal and the caller terminal.

Preferably, billing for the established communications session is applied to an account associated with the caller telephone.

In preferred embodiments the caller terminal comprises a caller telephone, the callee terminal comprises a callee telephone and the communication session comprises a telephone call. For example, the telephones could comprise a fixed line, corded or analogue or digital cordless telephone. Preferably, in such embodiments, the data identifying the caller and callee terminals comprises the telephone numbers associated with the terminals. In alternative embodiments, the data comprises information related to the location of the terminals (e.g. latitude/longitude coordinates derived using GPS (global positioning system).

In alternative embodiments the caller terminal and/or the callee terminal comprise a computer connected to a communications network and running a telephony software package. Preferably, in such embodiments, the data identifying the terminals comprises SIP (session initiation protocol) addresses.

In alternative embodiments, the communication session comprises a multimedia communications session (e.g. a video call). In such embodiments, the communications terminals could, for example, take the form of video telephones or computers as described above.

In preferred embodiments the mobile terminal comprises a mobile telephone. In other embodiments it comprises, for example, a personal digital assistant suitably enabled to access a communications network.

In preferred embodiments, the data relating to the mobile terminal comprises one or more of the International Mobile Station Equipment Identity, the International Mobile Subscriber Identity and the Mobile Station Integrated Services Digital Network number, which are all capable of uniquely identifying the combination of a mobile telephone handset and SIM card.

In preferred embodiments, the data identifying the callee is stored in a contacts database on the mobile terminal. In alternative embodiments, a user uses the mobile terminal to identify a callee in a source accessible from the mobile terminal (e.g. from a WAP (wireless application protocol) or HTML page displayed on the terminal or from a contacts database that is resident in the communications network but accessed from the mobile terminal.) In other embodiments, the data is sent to the mobile terminal via an SMS or MMS message. In all these embodiments, the data identifying the callee is easily accessible using the mobile terminal.

In preferred embodiments, the method further comprises the antecedent step of associating said caller terminal with said mobile terminal by storing, in a network based registration database, a mapping between data identifying said mobile terminal and data identifying said caller terminal. In this way, a record of registered users can be created and stored in the network, which can be used to restrict access to a service operating in accordance with this method to registered users of the service.

Preferably, the session initiation means is local to said caller terminal. Thus no additional equipment is required in the communications network.

Alternatively, the session initiation means is remote to said caller terminal. In some embodiments therefore, no additional customer premises equipment (CPE) is required.

Preferably, when the call initiation means is remote to said caller telephone, the session initiation means is operable to: (I) establish a first leg of said communications session with said caller terminal; (II) establish a second leg of said communications session with said callee terminal; and (III) connect said first and second legs together.

In preferred embodiments, the transferring step comprises transferring the data to the session initiation means initially via a wireless network. For example, when the session initiation means is local to the caller terminal, data could be transferred to the session initiation means via a Bluetooth, WiFi, 802.11 or comparable wireless network. When the session initiation means is remote to the caller terminal, data could be transferred to it initially via a GPRS, WiMax, 3G or other similar network. In such cases, no additional CPE equipment is required.

Preferably, when the session initiation means is remote to the caller terminal, the transferring step comprises: transferring said data from said mobile terminal to said session initiation means via an intermediate device local to said mobile terminal and connected to an internet, wherein said data is transferred via a wireless network between said mobile terminal and said intermediate device and via said internet between said intermediate device and said session initiation means. In this way, data can be transferred to the session initiation means without needing to access a longer range wireless network, such as a GPRS (general packet radio service), WiMax, 3G or other similar network. The wireless network could comprise a short (0-30 m) to medium range (up to several kilometers depending on environmental and regulatory factors) wireless network such as a Bluetooth, WiFi, 802.11 or similar wireless network.

Preferably, the method further comprises: associating a further caller terminal with said mobile terminal, said further caller terminal itself being associated with different identification data to said caller terminal; and operating said session initiation means to establish a communications session between one of said caller terminals and said callee terminal in dependence on the location of said mobile terminal. Preferably, the further caller terminal is at a location remote to the caller terminal. In this way, a user can register not just a single caller terminal but rather multiple caller terminals (for example, terminals at home at an office) for use with a service operating in accordance with the method.

Preferably, the method further comprises the step of storing in a database, for each caller terminal, a mapping between data identifying the caller terminal and data identifying the location of the caller terminal. The database can be based in the mobile terminal (thus eliminating the need for further network resources) or in the network (thus reducing the memory requirements in the mobile terminal).

Preferably, the mobile terminal is operable to determine its location. For example, the mobile terminal could identify the mobile network cell that it is communicating with. In this way, no extra network resources are needed to determine the location of the mobile.

In other embodiments, the communications system further comprises a location server in communication with the mobile terminal and/or the session initiation means and arranged in operation to provide location information (e.g. longitude and latitude) relating to the mobile terminal. The location information can be provided to the mobile terminal or the session initiation means. Preferably, the method further comprises determining the location of the mobile terminal in dependence on the location information.

Preferably, data identifying said caller terminal is additionally transferred in said transferring step. In this way, if multiple caller terminals have been registered, the caller terminal from which to establish the communications session can be identified. Moreover, transferring the data identifying the caller terminal may alleviate the need to store it in advance and therefore alleviate the need for a separate, network based database. In such embodiments, the user could be charged each time they use the service operating in accordance with the method.

Preferably, said caller terminal comprises a home caller terminal, said communications system further comprises a visitor caller terminal, said transferring step further comprises transferring data identifying said visitor caller terminal from said mobile terminal to said session initiation means, said operating step comprises operating said session initiation means to establish said communications session between said visitor caller terminal and said callee terminal, and billing for said communications session is applied to an account associated with said home caller terminal. In this way, a user can be at a location other than their home/office (e.g. friend's/colleague's/partner's home/office, i.e. at a location that they themselves have not registered with a service operating in accordance with the present invention) and use their mobile terminal to initiate a call at that location, which is then billed to their own bill/account.

In such embodiments, the method preferably further comprises storing, in a network based database, a mapping between data identifying said mobile terminal and data identifying said visitor caller terminal. Alternatively, the method preferably further comprises storing, in a network based database, a mapping between data identifying said visitor caller terminal and an authentication code, wherein said transferring step further comprises transferring said authentication code from said mobile terminal to said session initiation means, and said operating step is implemented if said transferred authentication code and said stored authentication code match. In these ways, the person in charge of the visitor caller terminal can control who can access the service from the visitor location. Preferably, the mappings could be stored for a predetermined period of time, thus providing the person in charge of the visitor caller terminal with yet more access control. In all these embodiments, the data identifying said visitor caller terminal preferably comprises the telephone number associated with the visitor caller terminal and the authentication code preferably comprises a four or more digit access code.

Other aspects of the present invention are defined in the claims.

Embodiments of the present invention will now be described, by way of example only, with reference to the accompanying drawings, wherein like reference numbers refer to like parts, and in which.

FIRST EMBODIMENT

Figure 1:
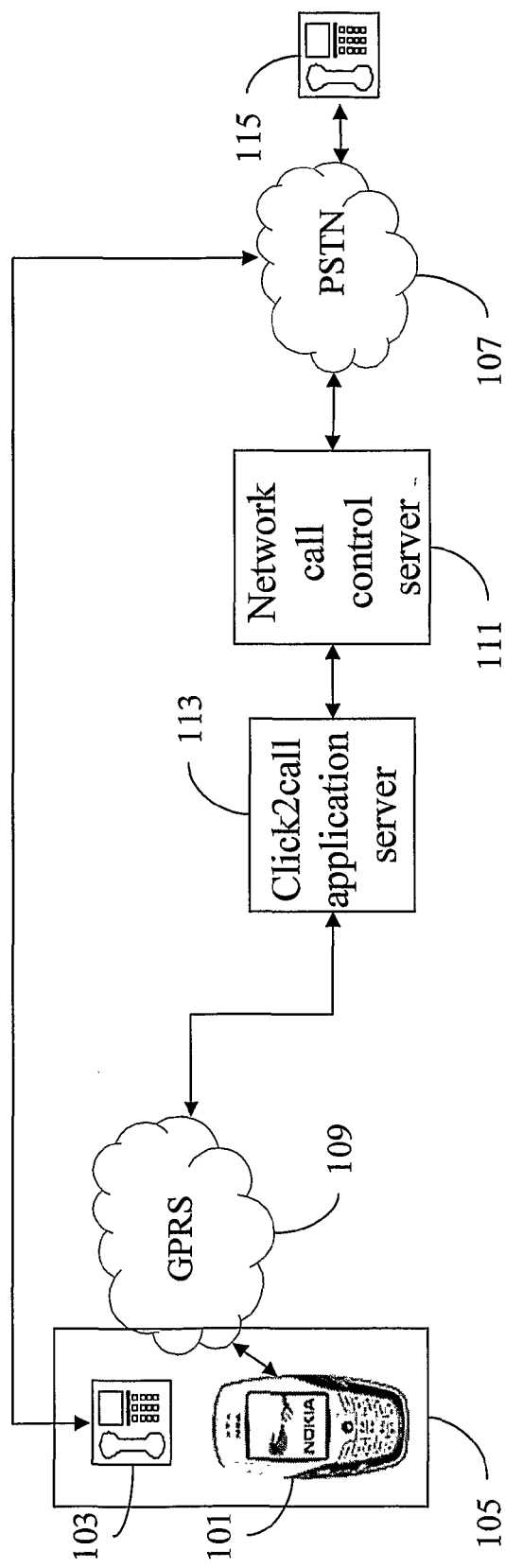
FIG. 1 is an illustration of a communications system according to a first embodiment of the present invention.
Figure 2:
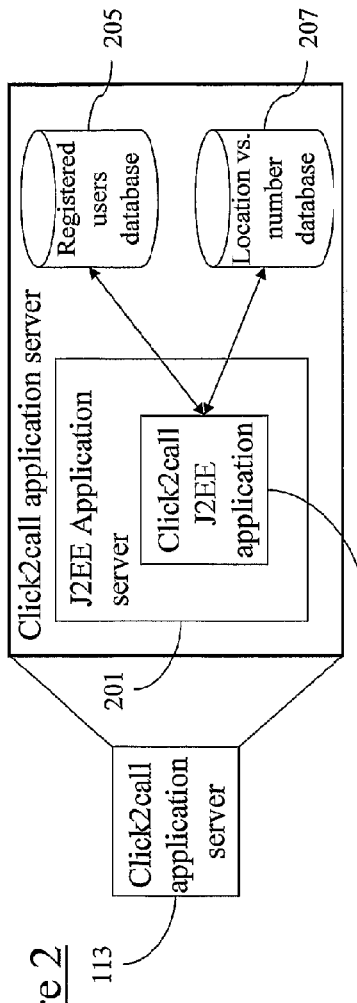
FIG. 2 is an illustration of the Click2call application server of the communications system of FIG. 1.

According to a first embodiment of the present invention and with reference to FIG. 1, a communications system is provided, which includes a mobile telephone handset 101 (such as the Nokia 6600) and a telephone A 103 located at a location A 105. In the present embodiment, telephone A 103 may be a fixed line, corded or analogue or digital cordless telephone and is connected to the public switched telephone network (PSTN) 107. The communications system further comprises a General Packet Radio Service (GPRS) network 109 and a network call control server 111 such as the Marconi Intelligent Networks platform, which provides third party call control functionality as specified by the standard Parlay Application Programming Interface (API). (Third party call control refers to the ability of one entity to create a telephone call in which communication is actually between other parties.) The network call control server 111 is connected to PSTN 107. Connected to the network call control server 111 is a Click2call application server 113, which is described in more detail in relation to FIG. 2. The Click2call application server 113 comprises a Java 2 Enterprise Edition (J2EE) application server 201 on which the Click2call J2EE application 203 resides. It also comprises two databases, a registered users database 205 and a location versus number database 207, which comprise Extensible Markup Language (XML) datafiles loaded by the Click2call application server 113. The role and population of databases 205/207 and the role of the Click2call application server 113 will be described in more detail later.

Figure 3:
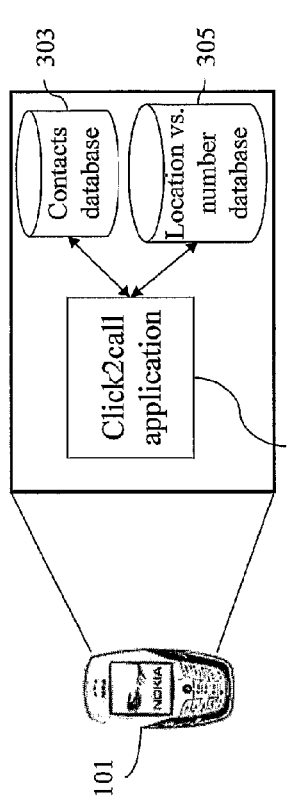
FIG. 3 is an illustration of the mobile telephone handset of the communications system of FIG. 1.

With reference to FIG. 3, mobile telephone handset 101 comprises a Click2call application client 301 that a user of handset 101 can download (e.g. over the GPRS network 109). In the present embodiment this application is a Symbian OS application although it could also comprise a Java application (e.g. J2ME (Java 2 Mobile Edition) or personal Java) or a SIM (subscriber identity module) card based application.

Call setup requests can be passed from Click2call application client 301 to network call control server 111 via Click2call application server 113. The Click2call application client 301 and Click2call application server 113 exchange messages over GPRS network 109, using HTTP request/response pairs, which are described in the chapter entitled "HTTP Transactions" in *HTTP Pocket Reference*, Wong, C., May 2000, ISBN 1-56592-862-8. The call setup requests are passed to drivers which interact with the Marconi platform via the Parlay call control API. It is also possible that this HTTP interface could comprise a Web Service API, e.g. the Parlay-X API.

Handset 101 also comprises two databases, a contacts database 303 and a location versus number database 305. The contacts database 303 comprises the address book or contact lists of handset 101 and can be accessed by the Click2call application client 301. The location versus number database 305 will be described in more detail later.

Figure 4:
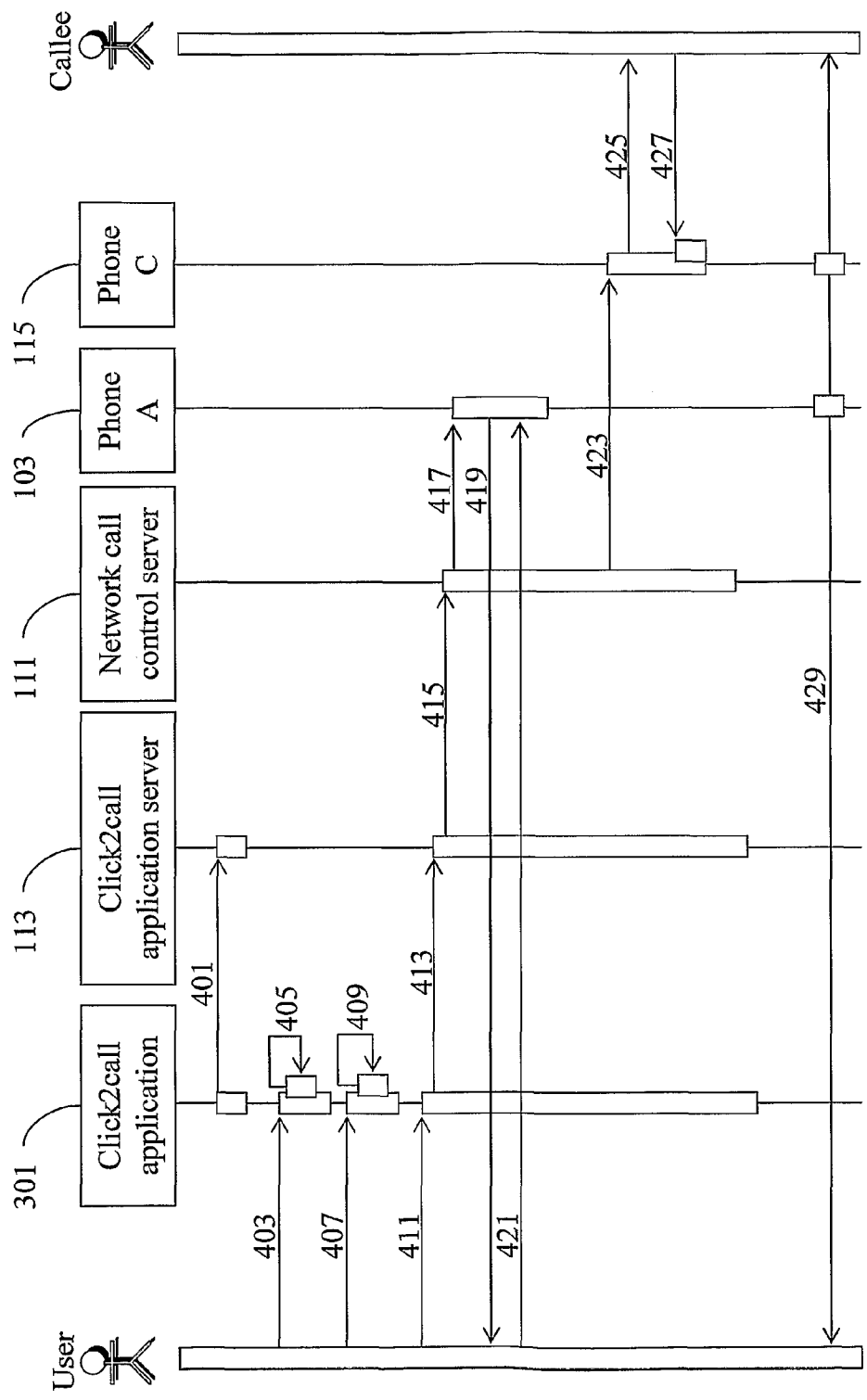
FIG. 4 is a sequence diagram illustrating the establishment of a communications session in accordance with the first embodiment of the present invention.

The process of establishing a communications session in accordance with this first embodiment of the present invention will now be described in relation to FIG. 4.

In an initial registration stage (not shown), the user registers mobile handset 101 and telephone A 103 with the Click2call service: In the preferred embodiment, the Click2call service is provided by the telephone company supplying service to telephone A 103. Registration can be effected by speaking to a call centre via mobile handset 101 and/or telephone A 103, short message system (SMS) message from mobile handset 101, using mobile handset 101 and GPRS network 109 to access a wireless application protocol (WAP) site or a combination of any of the above. Further ways of effecting registration of mobile handset 101 and telephone A 103 will be apparent to someone skilled in the art. The effect of registration is that a record is created in the registered users database 205 which stores details of mobile handset 101 and maps those details to the details of telephone A 103. The details of mobile handset 101 that may be stored are the International Mobile Station Equipment Identity (IMEI) number (a number unique to every mobile handset), the International Mobile Subscriber Identity (IMSI) number (a number unique to the SIM card inside the mobile handset 101 and the Mobile Station Integrated Services Digital Network (MSISDN) number (the phone number of mobile handset/SIM card) or a combination thereof. The details of telephone A 103 that are stored include the telephone number of the telephone line used by telephone A 103. In preferred embodiments, successful registration also enables the user to download the Click2call Symbian OS application client 301 to mobile handset 101.

The Click2call application client 301 is preferably configured to start automatically when mobile handset 101 is switched on. Once running, a user then uses the Click2call application client 301 instead of the default phone book/contacts list application of mobile handset 101.

In preferred embodiments, when mobile handset 101 is switched on, the Click2call application client 301 is configured to establish a GPRS session with GPRS network 109 and open a connection with the Click2call application server 113 (401). The Click2call application client 301 subsequently sends periodic 'heartbeat' messages to the Click2call application server 113 (e.g. every 5 minutes) thus ensuring that the GPRS connection is maintained in an active state while mobile handset 101 is switched on. This serves to reduce the delay at the time of establishing a communications session since the user will not have to wait for the GPRS session to be established before the Click2call application client 301 connects to the Click2call application server 113. In other embodiments, however, a GPRS session could be opened when the Click2call application client 301 is brought into the foreground by the user prior to placing a call or a GPRS session could be opened only when the user selects the callee.

Figure 5:
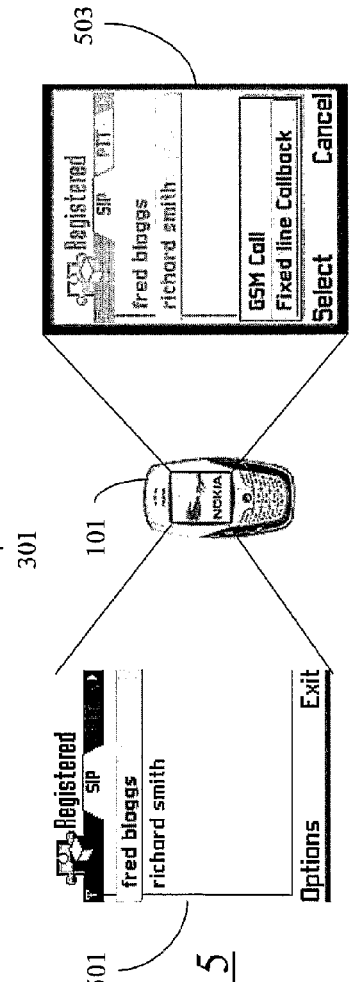
FIG. 5 is an illustration of screen shots that can be displayed on the screen of the mobile telephone handset of the communications system of FIG. 1.

When a user wishes to contact a callee, they bring the Click2call application client 301 into the foreground (403) using the on-screen menus of mobile handset 101. The Click2call application client 301 is configured to present the contents of contacts database 303 to the user (405), which, it will be remembered, comprises the address book or contact lists of mobile handset 101. The user then searches for the required contact's name (e.g. by scrolling down a list of contacts, entering one or more initial letters of the name(s) on the keypad etc.) and selects that contact (407). This is indicated in screenshot 501 shown in FIG. 5. Upon selecting the required contact name, the Click2call application client 301 then presents the user with the option of calling the contact directly using the mobile handset 101 (and its associated mobile communications network) or calling the contact via the Click2call service (409). This is indicated in screenshot 503 shown in FIG. 5, where 'Fixed Line Callback' relates to the Click2call service option. If the user chooses to call the contact directly, a normal mobile phone call is placed between mobile handset 101 and the callee, who uses telephone C 115 of FIG. 1. If, however, the user selects to use the Click2call service (411), as indicated by screenshot 503, the Click2call application client 301 sends an HTTP Post request to the Click2call application server 113 requesting a call setup (413), the Post request parameters including the telephone number of the telephone line used by the callee's telephone C 115 and one or more of the IMEI, IMSI and MSISDN of mobile handset 101.

The Click2call application server 113 then consults Registered users database 205 (which, it will be remembered, contains details of registered mobile handsets and maps those details to the details of the fixed line telephones associated with the registered handsets) to determine the corresponding telephone number of the telephone line used by telephone A 103. If a record is found in database 205 then Click2call application server 113 constructs an HTTP request and sends it to network call control server 111 (415) instructing it to setup a telephone call between telephone A 103 and telephone C 115.

Network call control server 111 then attempts to place one leg of the telephone call from itself to telephone A 103 by sending a ringing signal (e.g. 75V AC current @ 25 Hz) over PSTN 107 to telephone 103. Network call control server 111 is configured to not allow any network based call diversion that may divert telephone calls way from telephone A 103 (e.g. to a network based answer phone service or to another telephone number not having a stored association with mobile handset A 101). In response to receiving the ringing signal, telephone A 103 rings (419) thus alerting the user that he should lift the handset on telephone A 103. If the handset of telephone A 103 is not lifted within a pre-specified period of time, the network call control server 111 reports the failure to the Click2call application server 113, which in turn reports the failure back to the Click2call application client 301 on mobile handset 101, which indicates the failure to set up the call to the user. If, however, the handset of telephone A 103 is lifted within the specified period, network call control server 111 then attempts to place another leg of the telephone call from itself to telephone C 115, by sending a ringing signal over PSTN 107 to telephone C 115 (423), and then attempts to connect the two legs of the telephone call together so that it seems as if the telephone call to telephone C 115 had been dialed directly from telephone A 103. The user can hear a ringing tone through the handset of telephone A 103 and telephone C 115 rings (425), thus alerting the callee that there is an incoming telephone call to telephone C 115. Once the network call control server 111 has connected the two legs of the telephone call together, it plays no further part in the process as it has succeeded in establishing a telephone call from telephone A 103 to telephone C 115. The callee then picks up the handset of telephone C 115 (427) and can converse with the user, who is using telephone A 103 (429). Billing for the telephone call is arranged by the network call control server 111 to be applied to the account of telephone A 103. If the handset of telephone C 115 is not picked up, then the user will realise that the person he wanted to speak to (i.e. the callee) is not available and the user then replaces the handset of telephone A 103 ending the telephone call between telephone A 103 and telephone C 115.

SECOND EMBODIMENT

Figure 6:
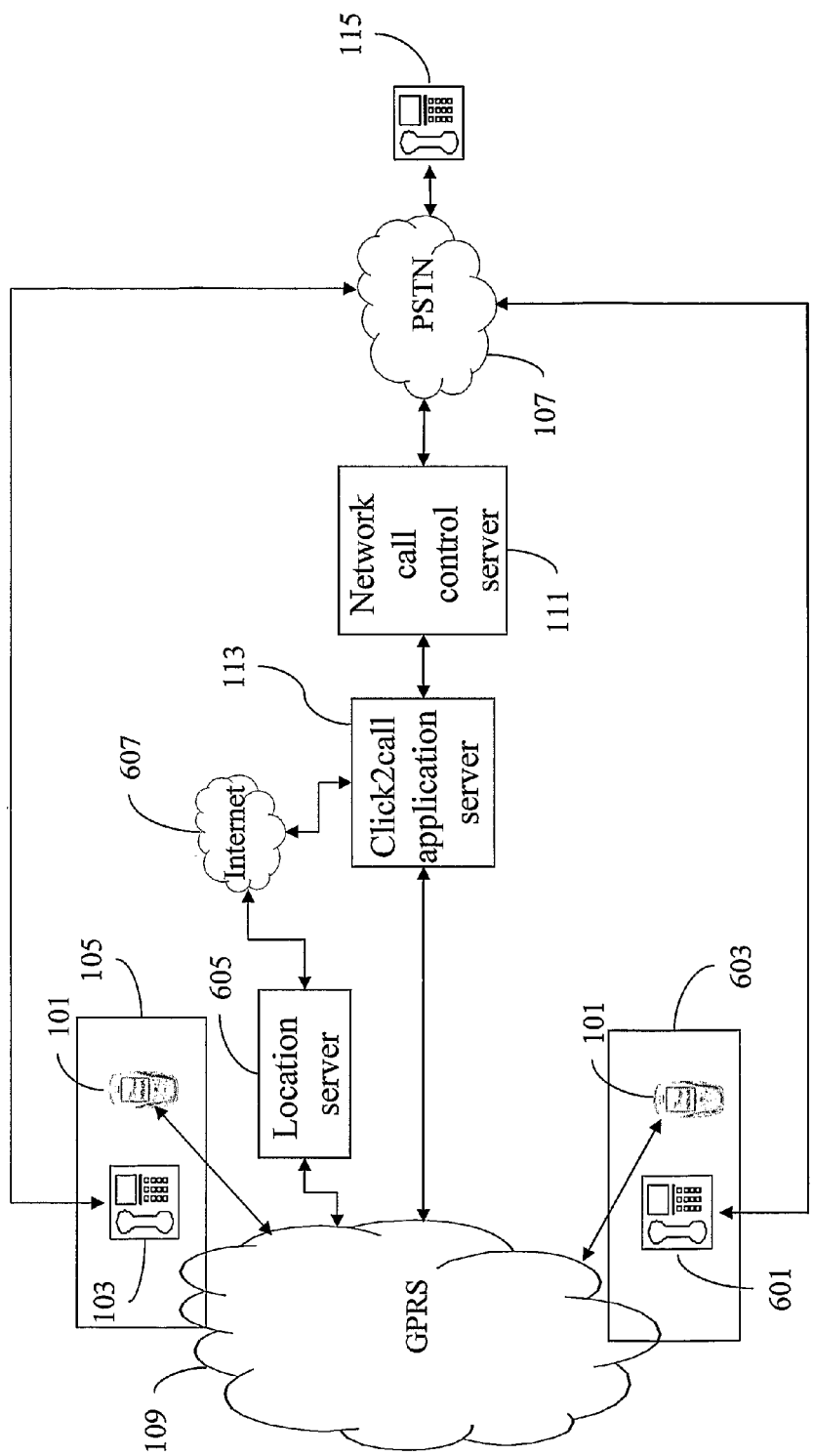
FIG. 6 is an illustration of a communications system according to second and third embodiments of the present invention.

According to a second, embodiment of the present invention, and in relation to FIG. 6, a communications system is provided, which, like in the previously described first embodiment, includes telephone A 103 (located at location A 105) and telephone C 115 both connected to PSTN 107, Click2call application server 113, network call control server 111 and GPRS network 109. The second embodiment differs from the first embodiment in that the communications system further comprises a telephone B 601 at a location B 603. Like telephone A 103, in the present embodiment, telephone B 601 may be a fixed line, corded or analogue or digital cordless telephone and is connected to PSTN 107.

In this embodiment, the user may register both telephone A 103 and telephone B 601 with the Click2call service and hence may use mobile handset 101 to make a call to a callee using the Click2call service from either location A 105 or location B 603. Location A 105 may be the user's home whilst location B 603 may be the user's office.

The method of registering mobile handset 101, telephone A 103 and telephone B 601 with the Click2call service is similar to that described above in the first embodiment and results in records being created in the registered users database 205 which store details of mobile handset 101 and map those details to the details of both telephone A 103 and telephone B 601. Registration is carried out both at location A 105 and location B 603. During registration at location A 105, the function GetCellID( ) of the Symbian Mobinfo API is run on mobile handset 101 to obtain the Cell Global Identifier (CGI) of the mobile network cell that mobile handset 101 is communicating with at location A 105. A CGI uniquely identifies each cell in a mobile communications network and thus, assuming location A 105 and location B 603 are separated by a large enough distance, mobile handset 101 will communicate with different cells at location A 105 and location B 603. Cell sizes can range from 1 km in urban areas to c35 km in rural areas. Alternative embodiments for the situation where a user wants to use the Click2call service with two telephones in the same cell will be described later.

Thus, during registration, the CGI at location A 105 is mapped to the telephone number of telephone A 103 and the mapping is stored as a record in location versus number database 305 of mobile handset 101. Similarly, during registration at location B 603, another record is created in location versus number database 305 that maps the CGI at location B 603 to the telephone number of telephone B 601.

Like in the above described first embodiment, the Click2call application client 301 is preferably configured to start automatically when mobile handset 101 is switched on. Once running, a user then uses the Click2call application client 301 instead of the default phone book/contacts list application of mobile handset 101.

Figure 7:
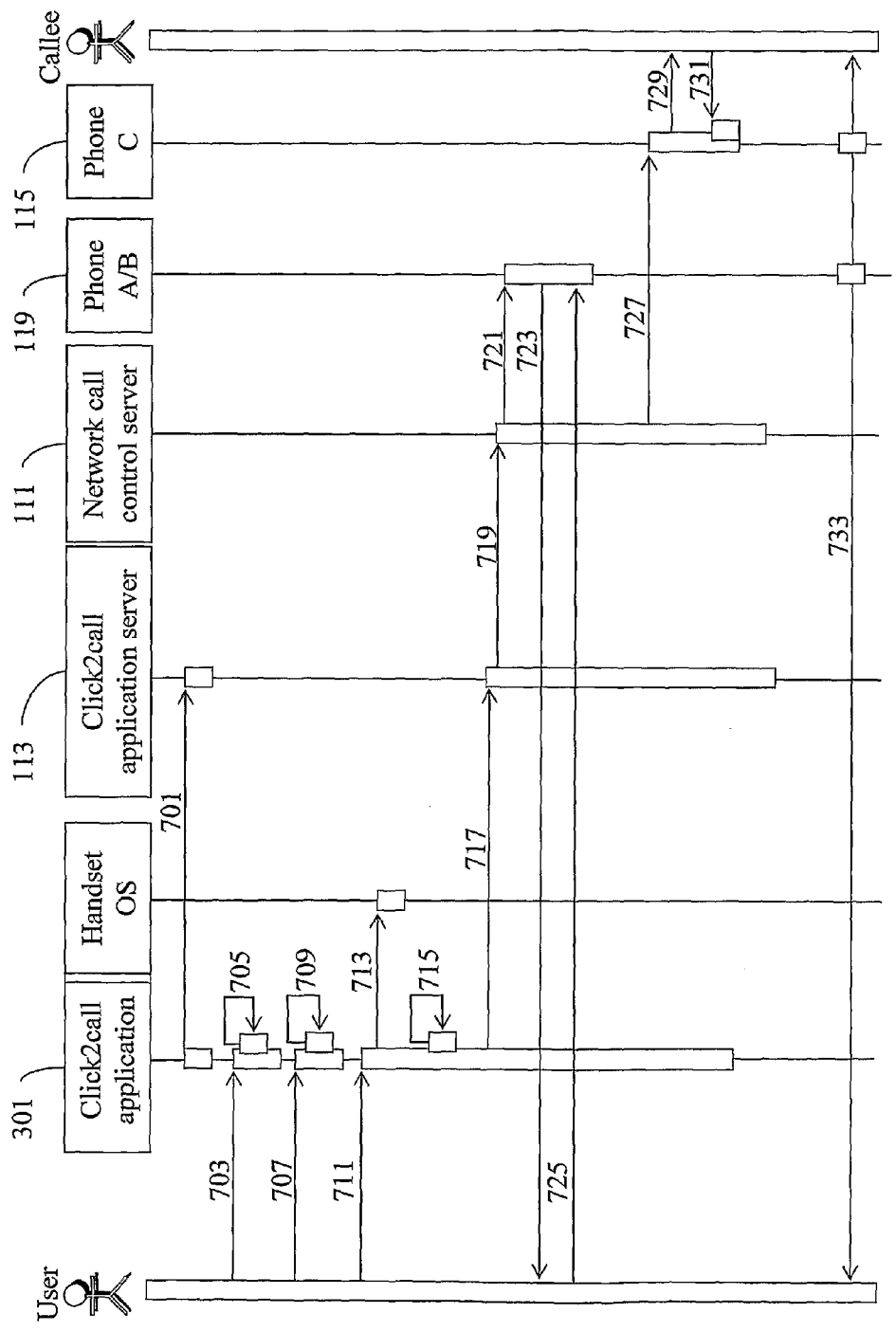
FIG. 7 is a sequence diagram illustrating the establishment of a communications session in accordance with the second embodiment of the present invention.

The process of establishing a communications session in accordance with this embodiment of the present invention will now be described in relation to FIG. 7 and is largely similar to the process described above in relation to FIG. 4.

The process for steps 701 to 709 is the same as that described above for steps 401 to 409 of FIG. 4.

If the user selects to use the Click2call service (711), the Click2call application client 301 runs the GetCellID( ) function of the Symbian Mobinfo API in order to get to obtain, from the mobile handset operating system (OS), the CGI of the mobile network cell that mobile handset 101 is communicating with (713). Then Click2call application client 301 consults the location versus name database 305 of mobile handset 101 in order to find the identity of the telephone that is associated with the previously obtained CGI (715). If mobile handset 101 is at location A 105, mobile handset OS returns the CGI of location A 105 and the identity of the associated telephone is that of telephone A 103. Alternatively, if mobile handset 101 is at location B 603, mobile handset OS returns the CGI of location B 603 and the identity of the associated telephone is that of telephone B 601.

The process for subsequent steps 717 to 733 is then the same as that described above for steps 413 to 429 in relation to FIG. 4 except that the HTTP Post request sent by Click2call application client 301 to Click2call server 113 requesting call setup (step 717) also includes the telephone number of either telephone A 103 or telephone B 601 as one of the Post request parameters, depending on the location of mobile handset 101. The process results in the creation of a telephone call from either telephone A 103 or telephone B 601 to telephone C 115 (depending on the location of mobile handset 101).

THIRD EMBODIMENT

According to a third embodiment of the present invention the communications system of FIG. 6 further comprises a location server 605. Mobile handset 101 is also operable to connect to a web service interface of location server 605 via a GPRS connection over GPRS network 109. Connection could either be direct to a mobile network operator's location lookup service (for example, the mobile operator O₂ provide access to the Location API—a web service API—to members of the SourceO₂ Developer Forum) or through a third party product such as Verilocation (from Overview Mapping Solutions, UK) or mapAmobile (from Cybit Ltd., UK).

Location server 607 can be used to determine the location of mobile handset 101 in situations where the user wishes to register multiple locations for use with the Click2call service but those locations are too close together, i.e. they share a common CGI. Location server 607 is operable to supply, on request, location information relating to the position/location of mobile handset 101 at the time the request is made. That Information may include the latitude, longitude and accuracy of the supplied longitude and latitude (e.g. in meters).

The method of registering mobile handset 101, telephone A 103 and telephone B 601 with the Click2call service is similar to that described above in the first embodiment and results in records being created in the registered users database 205, which store details of mobile handset 101 and map those details to the details of both telephone A 103 and telephone B 601. Like in the second embodiment, registration is carried out both at location A 105 and location B 603. During registration at location A 105, mobile handset 101 establishes a GPRS connection with GPRS network 109 and sends a location request to location server 607. Location server 607 responds with the location information of mobile handset 101 which can then be mapped to the telephone number of telephone A 103. The mapping is then stored as a record in location versus number database 305 of mobile handset 101. Similarly, during registration at location B 603, another record is created in location versus number database 305 that maps the location information of mobile handset 101 at location B 603 to the telephone number of telephone B 601.

Like in the above described first embodiment, the Click2call application client 301 is preferably configured to start automatically when mobile handset 101 is switched on. Once running, a user then uses the Click2call application client 301 instead of the default phone book/contacts list application of mobile handset 101.

Figure 8:
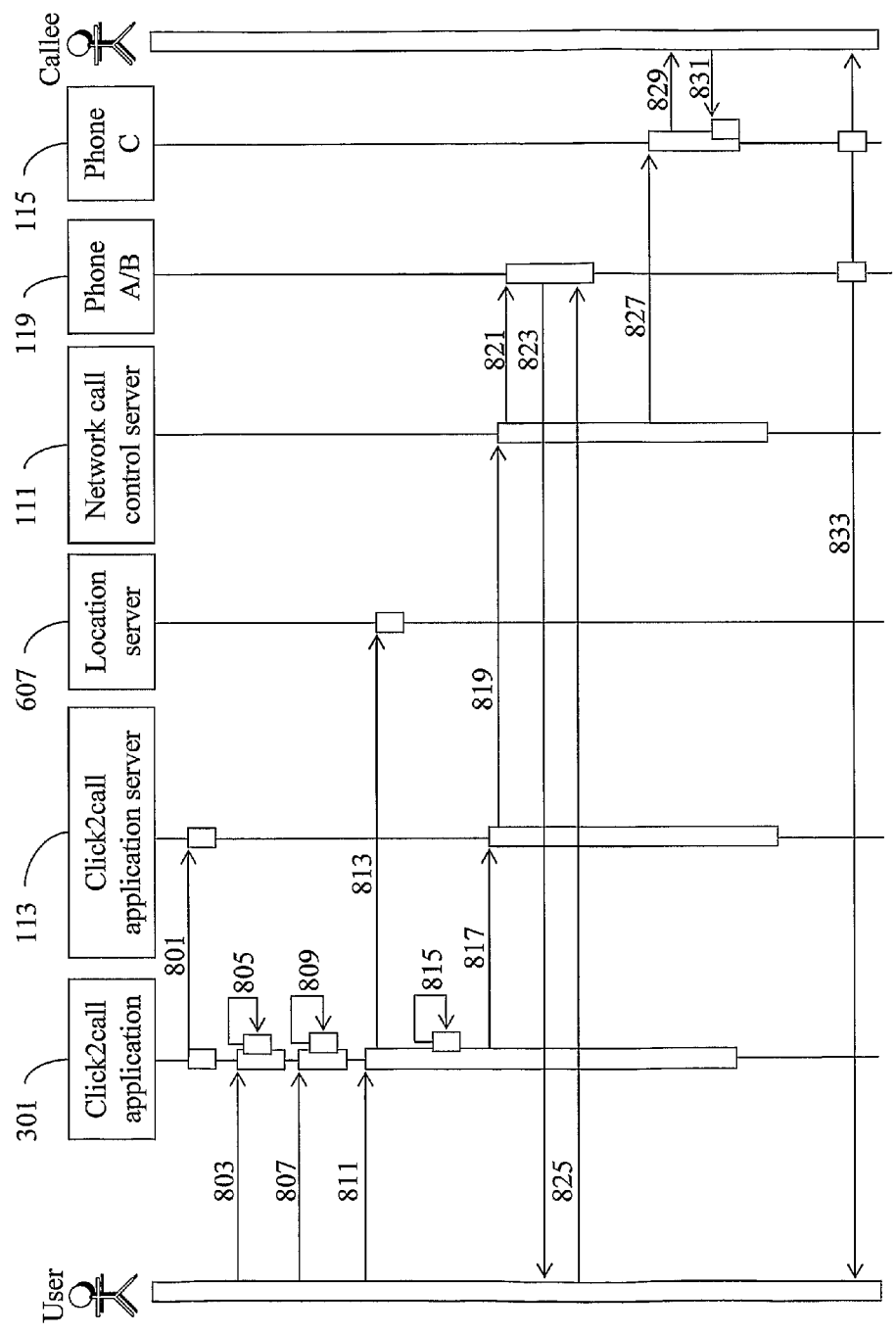
FIG. 8 is a sequence diagram illustrating the establishment of a communications session in accordance with the third embodiment of the present invention.

The process of establishing a communications session in accordance with this embodiment of the present invention will now be described in relation to FIG. 8 and is largely similar to the process described above in relation to FIG. 4.

The process for steps 801 to 809 is the same as that described above for steps 401 to 409 of FIG. 4.

If the user selects to use the Click2call service (811), the Click2call application client 301 sends a location request to location server 607, which responds with the location information of mobile handset 101. Then Click2call application client 301 consults the location versus name database 305 of mobile handset 101 in order to find the identity of the telephone that is associated with the previously obtained location information (815). If mobile handset 101 is at location A 105, location server 607 returns the location information of location A 105 and the identity of the associated telephone is that of telephone A 103. Alternatively, if mobile handset 101 is at location B 603, location server 607 returns the location information of location B 603 and the identity of the associated 10, telephone is that of telephone B 601.

The process for subsequent steps 817 to 833 is then the same as that described above for steps 413 to 429 in relation to FIG. 4 except that the HTTP Post request sent by Click2call application client 301 to Click2call server 113 requesting call setup (step 817) also includes the telephone number of either telephone A 103 or telephone B 601 as one of the Post request parameters, depending on the location of mobile handset 101. The process results in the creation of a telephone call from either telephone A 103 or telephone B 601 to telephone C 115 (depending on the location of mobile handset 101).

FOURTH EMBODIMENT

In the above described, third embodiment, it is mobile handset 101 that determines where it is by contacting the location server 607 itself. Alternatively, according to a fourth embodiment of the present invention, the Click2call application server 113 contacts the location server 607 and sets up the call accordingly.

It will be recalled that in the third embodiment, during the registration stages, location information for location A 105 was mapped to the telephone number of telephone A and then stored as a record in location versus number database 305 of mobile handset 101. Similarly, during registration at location B 603, another record was created in location versus number database 305 that maps the location information of mobile handset 101 at location B 603 to the telephone number of telephone B 601. In the present embodiment, however, these mappings of location information to telephone numbers are stored, instead, in the location versus number database 207 of Click2call application server 113.

Figure 9:
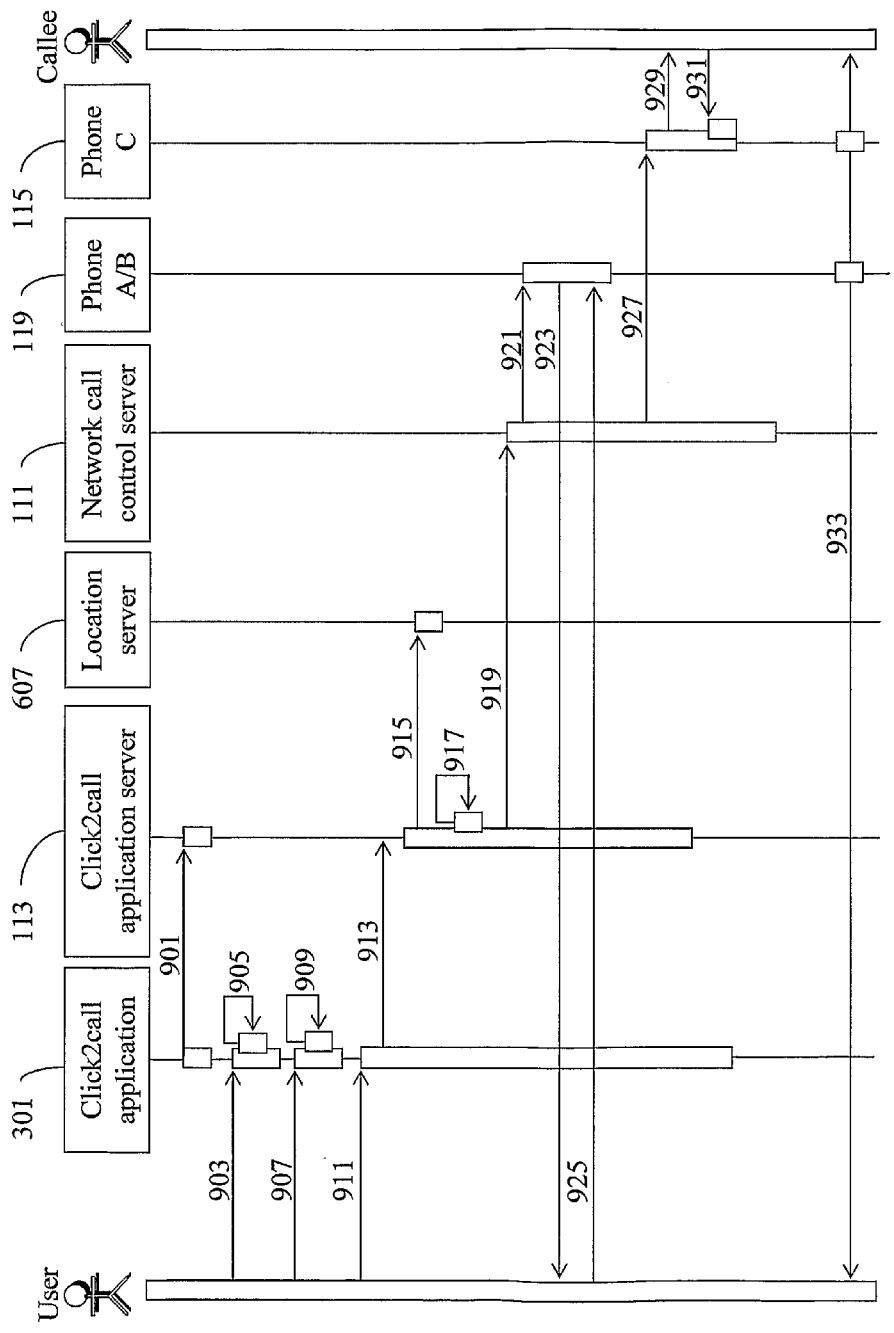
FIG. 9 is a sequence diagram illustrating the establishment of a communications session in accordance with the fourth embodiment of the present invention.

The process of establishing a communications session in accordance with this fourth embodiment of the present invention will now be described in relation to FIG. 9. The process for steps 901 to 913 is the same as that described above for steps 401 to 413 of FIG. 4.

It will be recalled that if the user selects to use the Click2call service (911), the Click2call application client 301 sends an HTTP Post request to the Click2call application server 113 requesting a call setup (913). Upon receiving such a request, Click2call application server 113 sends a location request to location server 607 (915), which responds with the location information of mobile handset 101. Then Click2call application server 113 consults location versus name database 207 in order to find the identity of the telephone that is associated with the previously obtained location information (917). If mobile handset 101 is at location A 105, location server 607 returns the location information of location A 105 and the identity of the associated telephone is that of telephone A 103. Alternatively, if mobile handset 101 is at location B 60.3, location server 607 returns the location information of location B 603 and the identity of the associated telephone is that of telephone B 601.

The process for subsequent steps 919 to 933 is then the same as that described above for steps 415 to 429 in relation to FIG. 4, which results in the creation of a telephone call from either telephone A 103 or telephone B 601 to telephone C 115 (depending on the location of mobile handset 101).

FIFTH EMBODIMENT

In all the previous embodiment, the Click2call application client 301 (installed on mobile handset 101) and the Click2call application server 113 exchange messages via GPRS network 109. However, there may be circumstances where a GPRS network is not available or the user may incur additional charges through the use of the GPRS network. Moreover, in the above described embodiments that involved use of location server 605, additional charges would be incurred when location information is requested from location server 605. Both the use of the GPRS network and location server may also add delays and therefore increase the response time of the Click2call service.

Figure 10:
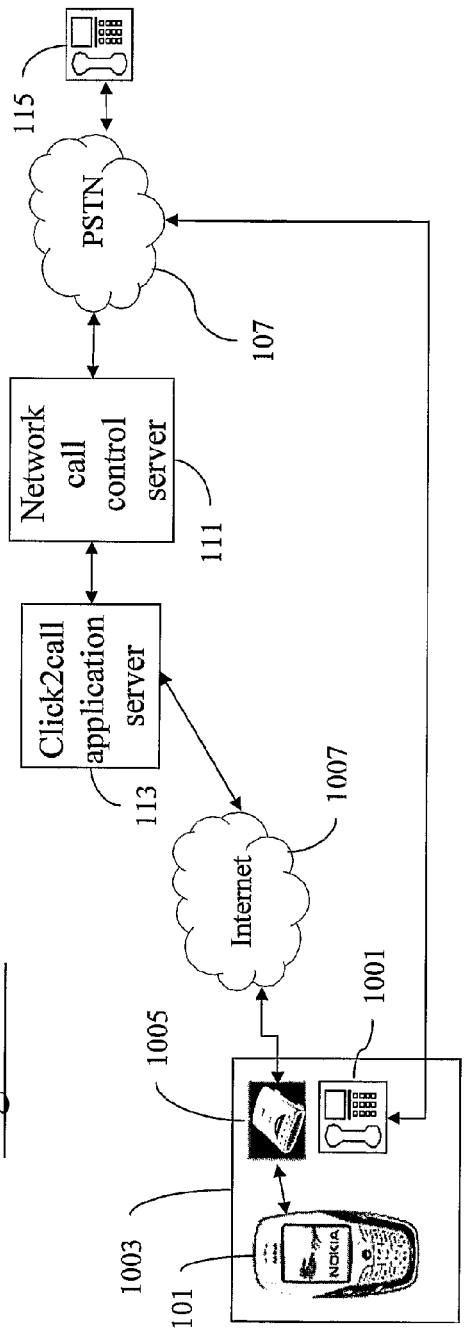
FIG. 10 is an illustration of a communications system according to a fifth embodiment of the present invention.

According to a fifth embodiment of the present invention and referring now to FIG. 10, the communications system comprises a mobile telephone handset 101 and a telephone D 1001 located at a location D 1003. Like in the previously described embodiments, in the present embodiment, telephone D 1001 may be a fixed line, corded or analogue or digital cordless telephone connected to the public switched telephone network (PSTN) 107. Also connected to PSTN 107 is network call control server 111 and connected to it is Click2call application server 113. Mobile handset 101 again includes a Click2call application client 301 and two databases, a contacts database 303 and a location versus number database 305. The contacts database 303 comprises the address book or contact lists of handset 101 and can be accessed by the Click2call application client 301.

In this fifth embodiment, the Click2call application client 301 and Click2call application server 113 exchange messages over a combination of a short-medium range wireless connection (e.g. Bluetooth, WiFi, 802.11 etc.) and an 'always-on' internet connection (broadband, DSL (digital subscriber line), cable modem, LAN (local area network) connection etc.) Preferably, mobile handset 101 exchanges messages with Click2call application server 113 via a Bluetooth enabled ADSL router/modem 1005 (hereinafter BT basestation 1005) (such as the Bluetooth ADSL Voice and Data Access Point available from IVT Corporation) using HTTP request/response pairs. Message exchange between mobile handset 101 and BT basestation 1005 is over a Bluetooth connection whilst message exchange between BT basestation 1005 and Click2call application server is over the internet connection. Other connection options will be apparent to someone skilled in the art.

Figure 11:
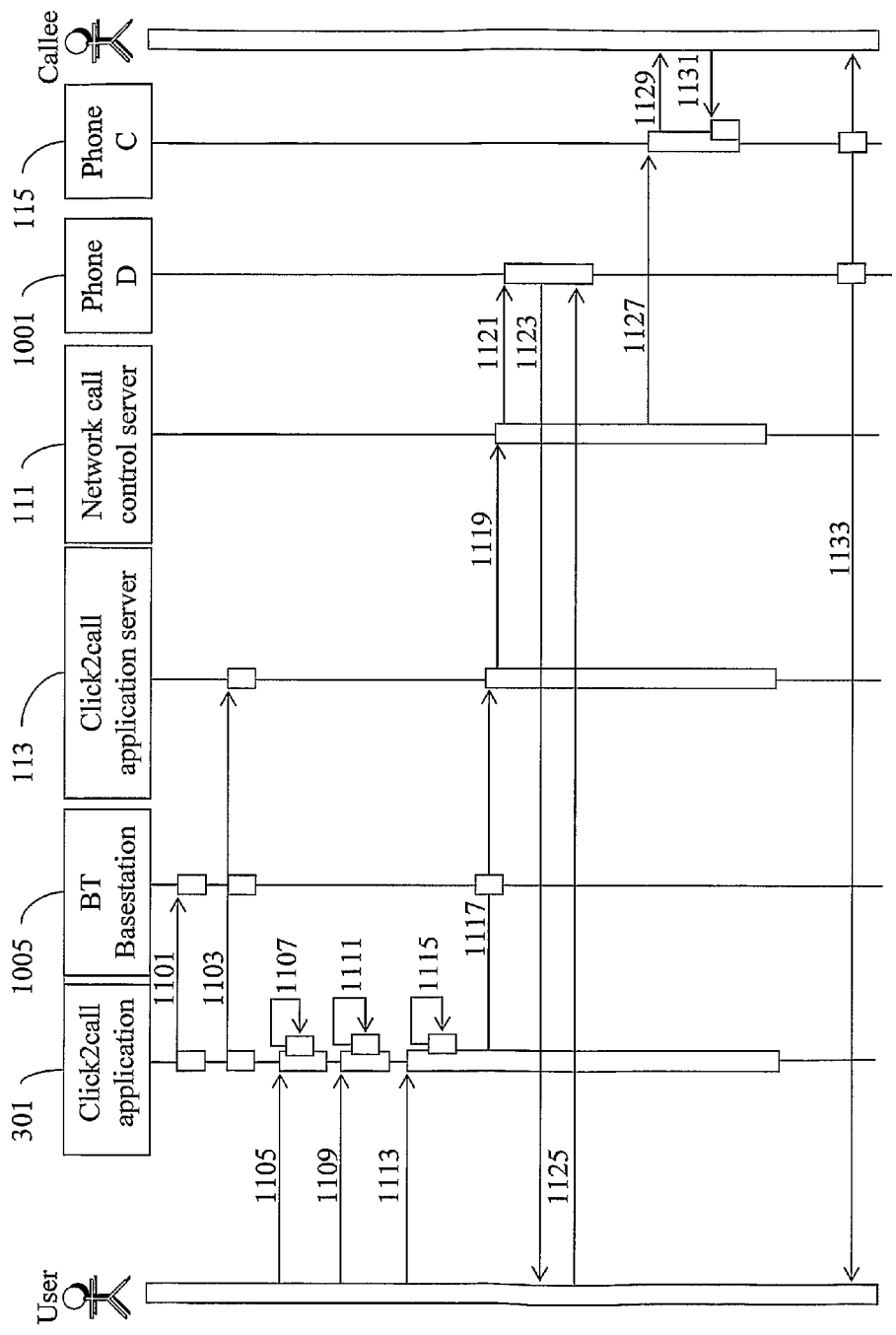
FIG. 11 is a sequence diagram illustrating the establishment of a communications session in accordance with the fifth embodiment of the present invention.

The process of establishing a communications session in accordance with this fifth embodiment of the present invention will now be described in relation to FIG. 11.

As in the previously described embodiments, the user registers mobile handset 101 and telephone D 1001 with the Click2call service in an initial registration stage (not shown). The Click2call application client 301 is preferably configured to start automatically when mobile handset 101 is switched on. Once running, a user then uses the Click2call application client 301 instead of the default phone book/contacts list application of mobile handset 101.

The next stage (1101) is then to associate BT basestation 1005 with telephone D 1001. When the user first wishes to register BT basestation 1005, they select an appropriate option on the GUI (graphical user interface) of the Click2call application client 301. In combination with Bluetooth service discovery functionality of mobile handset 101, Click2call application client 301 then searches for Bluetooth devices to which it can connect by searching for Bluetooth signals that are being output from nearby Bluetooth devices that are in a 'discoverable' state (those skilled in the art will know that Bluetooth signals have a limited range of approximately 10 m). The method of placing a Bluetooth in a discoverable state (i.e. enabling it to be 'found' by another Bluetooth device) varies from device to device but may involve pressing a button on the device.

The GUI of Click2call application client 301 displays to the user a list of nearby Bluetooth devices and the user selects the identifier for the chosen Bluetooth device, which in the present embodiment is the identifier of BT basestation 1005. This action 'pairs' mobile handset 101 and BT basestation 1005 (i.e. certain connection information (e.g. device name, passkey etc.) is saved so that subsequent actions can occur automatically.)

By communicating with Click2call application server 113, Click2call application client 301 is aware of the identity of telephone D 1001 that the user has registered with the Click2call service. The GUI of Click2call application client 301 then displays to the user the identity of telephone D 1001 (and any other telephones that the user may have registered with the Click2call service for use in conjunction with mobile handset 101) and the user selects the appropriate identifier, which in the present embodiment is the identifier of telephone D 1001. This creates an entry in the location versus number database 305 of mobile handset 101 associating BT basestation 1001 with telephone D 1001. It is to be noted that on subsequent occasions, when the user wishes to use the Click2call service from the same location D 1003, the above described association process does not need to be repeated. Rather, when the user of handset 101 comes into range of BT basestation 1005, mobile handset 101 is able to detect the presence of BT basestation 1005, note its identity and therefore determine that telephone D 1001 is the appropriate telephone to use at location D 1003 when the Click2call service is initiated. Optionally, mobile handset 101 can be configured to alert the user to the fact that the Click2call service is available at that location through, for example, a visual or aural signal.

Preferably, when mobile handset 101 is switched on, the Click2call application client 301 is configured to establish a connection over Bluetooth to BT basestation 1005, which itself establishes a connection over the internet 1007 to Click2call application server 113 (1103). In other embodiments, however, the connections could be established when the Click2call application client 301 is brought into the foreground by the user prior to placing a call or the connections could be established only when the user selects the callee to be called.

When a user wishes to place a call to a callee, the process for steps 1105 to 1111 is the same as that described above for steps 403 to 409 of FIG. 4.

If the user selects to use the Click2call service (1113), the Click2call application client 301 consults the location versus name database 305 of mobile handset 101 in order to find the identity of the telephone that is associated with BT basestation 1005 (1115), which in this case is telephone D 1001.

Then, Click2call application client 301 sends an HTTP Post request to the Click2call application server 113 (via BT basestation 1005) requesting a call setup (1117), the Post request parameters including the IMEI, IMSI and MSISDN of mobile handset 101, the telephone number of the telephone line used by telephone D 1001 and the telephone number of the telephone line used by the callee's telephone C 115.

The process for subsequent steps 1119 to 1133 is then the same as that described above for steps 415 to 429 in relation to FIG. 4 and results in the creation of a telephone call from telephone D 1001 to telephone C 115.

SIXTH EMBODIMENT

Figure 12:
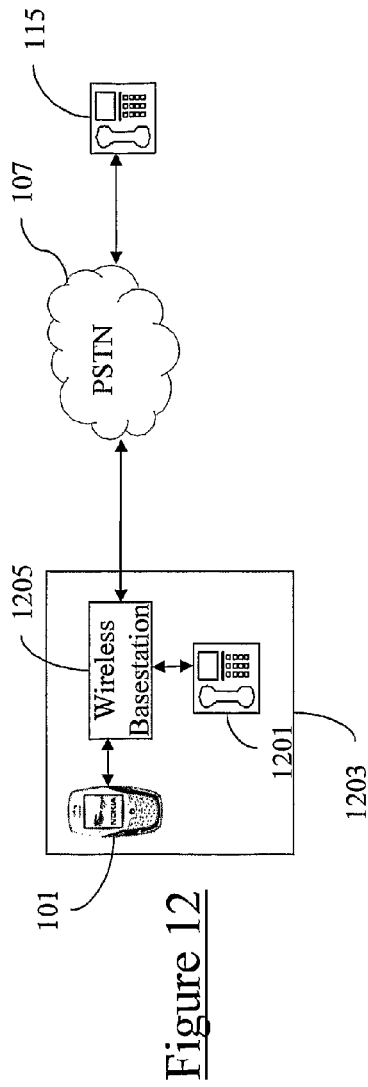
FIG. 12 is an illustration of a communications system according to a sixth embodiment of the present invention.

According to a sixth embodiment of the present invention and referring now to FIG. 12, the communications system comprises a mobile telephone handset 101 and a telephone E 1201 located at a location E 1203. Like in the previously described embodiments, in the present embodiment, telephone E 1201 may be a fixed line, corded or analogue or digital cordless telephone connected to the public switched telephone network (PSTN) 107. Mobile handset 101 again includes a Click2call application client 301 and contacts database 303. The contacts database 303 comprises the address book or contact lists of handset 101 and can be accessed by the Click2call application client 301.

Unlike in previous embodiments, call setup in this sixth embodiment is not performed by network based servers but rather by customer premises equipment (CPE). Thus, the communications system further comprises a wireless basestation 1205 situated at location E 1203 and connected to telephone E 1201, PSTN 107 and a power source (not shown).

Figure 13:
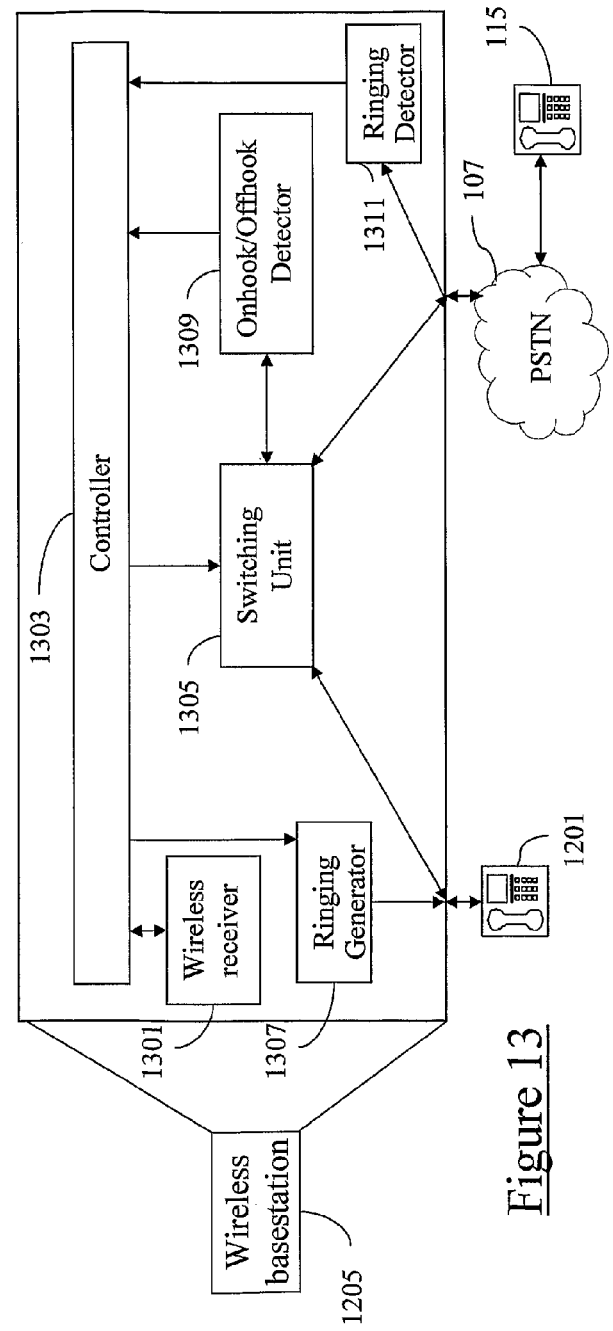
FIG. 13 is an illustration of the wireless basestation of the communications system of FIG. 12.

Referring now to FIG. 13, wireless basestation 1205 comprises a wireless receiver 1301 connected to a controller 1303. Also connected to controller 1303 are switching circuit 1305, ringing current generator 1307, onhook/offhook detector 1309 and ringing detector 1311. Onhook/offhook detector 1309 is also connected to switching unit 1305. Ringing generator 1307 is connected to telephone E 1201, ringing detector 1311 is connected to PSTN 107 and switching unit 1305 is connected to both telephone E 1201 and PSTN 107.

If the handset of telephone E 1201 is lifted, this is detected by onhook/offhook detector 1209 causing controller 1303 and switching unit 1305 to connect telephone E 1201 to PSTN 107. Also, if ringing detector 1311 detects any incoming calls from PSTN 107, controller 1303 causes ringing generator 1307 to send a ringing signal to telephone E 1201.

In this sixth embodiment, Click2call application client 301 and wireless basestation 1205 exchange messages (via wireless receiver 1301) over Bluetooth, however, any short-medium range wireless connection (e.g. WiFi, 802.11 etc.) could be used.

Figure 14:
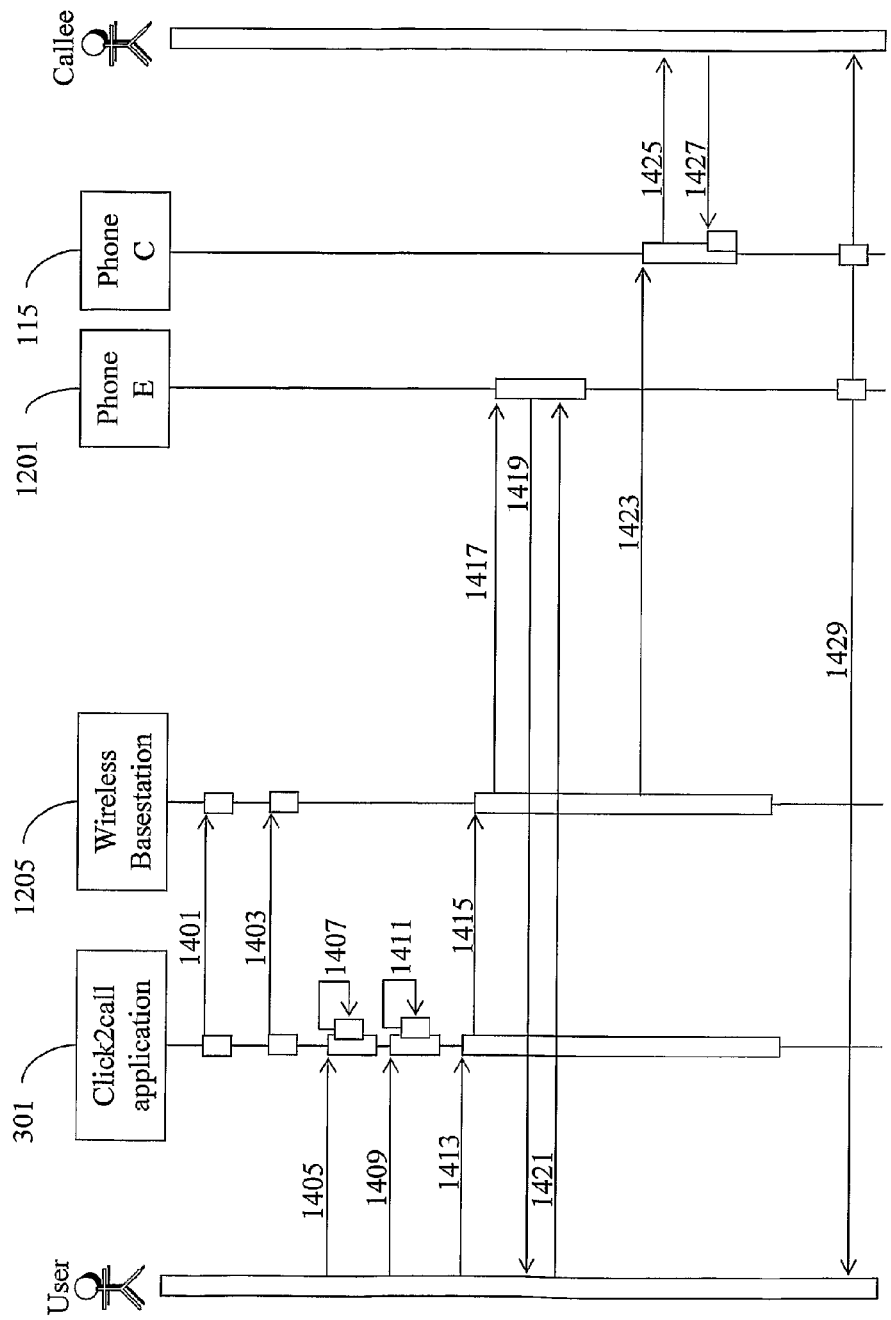
FIG. 14 is a sequence diagram illustrating the establishment of a communications session in accordance with the sixth embodiment of the present invention.

The process of a user placing a telephone call to a callee in accordance with this sixth embodiment of the present invention will now be described in relation to FIG. 14.

As in the previously described embodiments, the user downloads the Click2call application client 301 to mobile handset 101 and installs wireless basestation 1205 (not shown). The Click2call application client 301 is preferably configured to start automatically when mobile handset 101 is switched on. Once running, a user then uses the Click2call application client 301 instead of the default phone book/contacts list application of mobile handset 101.

In step 1401, the user 'pairs' mobile handset 101 with wireless basestation 1205. The user selects an appropriate option on the GUI (graphical user interface) of the Click2call application client 301. In combination with Bluetooth service discovery functionality of mobile handset 101, Click2call application client 301 then searches for Bluetooth devices to which it can connect by searching for Bluetooth signals that are being output from nearby Bluetooth devices that are in a 'discoverable' state (those skilled in the art will know that Bluetooth signals have a limited range of approximately 10 m). The method of placing a Bluetooth in a discoverable state (i.e. enabling it to be 'found' by another Bluetooth device) varies from device to device but may involve pressing a button on the device. The GUI of Click2call application client 301 displays to the user a list of nearby Bluetooth devices and the user selects the identifier for the chosen Bluetooth device, which in the present embodiment is the identifier of wireless basestation 1205. This action 'pairs' mobile handset 101 and wireless basestation 1205.

Preferably, when mobile handset 101 is switched on, the Click2call application client 301 is configured to establish a connection over Bluetooth to wireless basestation 1205 (1403). In other embodiments, however, the connections could be established when the Click2call application client 301 is brought into the foreground by the user prior to placing a call or the connections could be established only when the user selects the callee to be called. Preferably, a visual and/or aural notification is provided to the user that he is within range of wireless basestation 1205.

When a user wishes to place a call to a callee, the process for steps 1405 to 1409 is the same as that described above for steps 403 to 407 of FIG. 4. Upon selecting the required contact name, and if the user is within range of wireless basestation 1205, the Click2call application client 301 presents the user with the option of calling the contact directly using the mobile handset 101 (and its associated mobile telecommunications network) or calling the contact via the Click2call service (1411). If the user is not within range of wireless basestation 1205, then the call is placed directly using the mobile handset 101.

If the user selects to use the Click2call service (1413), the Click2call application client 301 sends a request to wireless basestation 1205 requesting a call setup (1415), the request parameters including the telephone number of the telephone line used by the callee's telephone C 115.

Controller 1303 of wireless basestation 1205 receives the request (via wireless receiver 1301) and exchanges messages with switching unit 1205 and onhook/offhook detector 1309 to check whether a telephone call is currently being held on the telephone line that telephone E 1201 is connected to. If a call is currently in progress then the call setup request from Click2call application 301 is declined. Preferably, a visual and/or aural indication of the call setup request failure is provided to the user. If no call is in progress, controller 1303 then sends a message to ringing generator 1307 causing a ringing signal to be sent to telephone E 1201 (1417) thus causing telephone E 1201 to ring (1419). Preferably, at the same time, a 'placing call' confirmation message is sent to handset 101 for display on the screen of handset 101.

As soon as the user picks up the handset of telephone E 1201 (1421), controller 1303 and switching unit 1305 connect telephone E 1201 to PSTN 107 and dial the requested telephone number of callee's telephone 115 using DTMF (dual tone multiple frequency) dialing.

The user hears a ringing tone through the handset of telephone E 1201 and telephone C 115 rings (1425), thus alerting the callee that there is an incoming telephone call to telephone C 115. A telephone call from telephone E 1201 to telephone C 115 has been created. The callee then picks up the handset of telephone C 115 (1427) and can converse with the user, who is using telephone E 1201 (1429). If the handset of telephone C 115 is not picked up, then the user will realise that the person he wanted to speak to (i.e. the callee) is not available and the user then replaces the handset of telephone E 1201 ending the telephone call between telephone E 1201 and telephone C 115.

Figure 15:
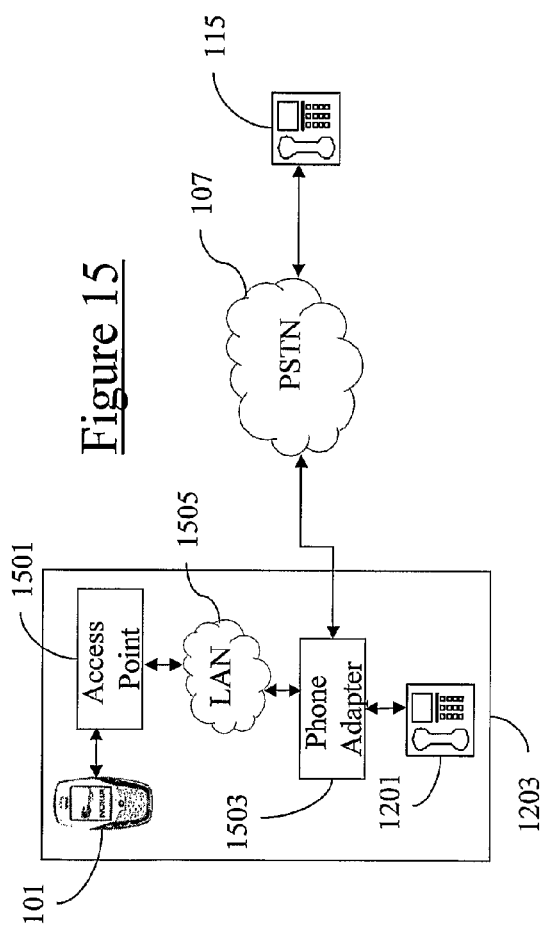
FIG. 15 is an illustration of an alternative communications system according to the sixth embodiment of the present invention.

A modification of the communications system according to this sixth embodiment is described below in relation to FIG. 15.

In this modification, a wireless access point 1501, phone adapter 1503 and a private LAN 1505 replace wireless basestation 1205. Telephone E 1201 is connected to phone adapter 1503, which is also connected to PSTN 107. Access point 1501 may be the Bluetooth Access Point available from Belkin Corporation, CA, USA and hence mobile telephone handset 101 is able to exchange data with access point 1501 over Bluetooth.

Phone adapter 1503 may be the Sipura phone adapter SPA-3000 available from Sipura Technology, Inc., CA, USA. Both access point 1501 and phone adapter 1503 are connected to LAN 1209 and use private Internet Protocol (IP) addresses that can be fixed in advance.

In the modification, session initiation protocol (SIP) $3^{rd}$ party call control techniques, as described in section 4.1 of Request for Comment 3725 of the Internet Engineering Task Force (IETF), are used. Click2call application client 301 sends SIP messages, as defined in RFC 3725, to create a SIP session between the telephone E 1201 that is connected to phone adapter 1503 and PSTN 107 that is also attached to phone adapter 1503.

Phone adapter 1503 provides two SIP clients, one associated with telephone E 1201, which has a predetermined, static SIP address (e.g. telephoneE@192.168.1.11:5060) and one associated with PSTN 107, which has a dynamic SIP user name (e.g. 646473@192.168.1.11:5061), which if set to a valid telephone number (i.e. 646473) will cause the PSTN SIP client to dial the telephone number and provide a SIP to PSTN bridging function. RFC 3725 defines the SIP message flow between the two SIP clients in phone adapter 1503 and Click2call application client 301 that enables the media streams for the two SIP clients (i.e. voice data) to be connected to enable a user of telephone E 1201 to talk to a user of telephone C 115. Click2call application client 301 provides the 'Controller' function described in RFC 3725.

It will be apparent from the foregoing description that many modifications or variations may be made to the above described embodiments without departing from the invention. Such modifications and variations include:

Although in some of the above described embodiments two locations were described—location A 105 and location B 603—and at each of the locations the exchange of messages between Click2call application client 301 and Click2call application server 113 was via GPRS network 109, it is also possible that more than two locations can be registered with the Click2call service and the exchange of messages at one or more of the locations could be via a combination of a short-medium range wireless connection and a high speed internet connection, as described above in relation to the fifth embodiment. It is also possible that one or more of the multiple locations is equipped with apparatus as described above in relation to the sixth embodiment.

It may also be the case that a wireless basestation is provided at one or more locations that does not have access to the internet. In such a case, the method for determining the location of mobile handset 101 (and therefore which location's telephone to use), as described above in relation to the second, third or fifth embodiments, could be used but then a GPRS connection could be used to contact Click2call application server 113 in order to setup the Click2call service telephone call.

In the above described embodiments, during the call setup process, the user does not get any acknowledgement of how the setup process is progressing and thus it may end for a reason unbeknown to him. In alternative embodiments, Click2call application server 113 or wireless basestation 1205 could be arranged to send to Click2call application 301 multiple acknowledgement messages as the call setup process progresses, which would be displayed on the screen of mobile handset 101. Alternatively or additionally, an aural signal could give some indication to the user of the progress of the call setup process. The stages of the call setup process that could be acknowledged with progress messages include: Telephone A/B/D/E ringing, engaged, answered, not answered within timeout, hung-up, telephone C ringing, engaged, answered, not answered within timeout, hung-up. Other stages of the setup process that could be acknowledged by progress messages will be apparent to someone skilled in the art.

Although in the above described fifth and sixth embodiments the user manually selected whether to call directly from mobile handset 101 or to use the Click2call service, the system could be configured to automatically use the Click2call service whenever mobile handset 101 was within range of one of its registered wireless basestations. Alternatively, when the user selects a contact to call, Click2call application client 301 could be configured to automatically determine whether to place the call over the mobile network or via the Click2call service in dependence on the phone number of the contact to be called and the costs associated with each option. For example, if the telephone number of the contact to be called is a mobile telephone number that is part of the same mobile network as the user's telephone number, it may be cheaper to place the call over the mobile network and not via the Click2call service. However, if the telephone number of the contact to be called is a fixed line telephone number then it may be cheaper to use the Click2call service.

Although in the above described sixth embodiment, if a call was found to be in progress, the call setup request from Click2call application 301 was declined, in an alternative embodiment, the call setup request could be accepted. In this embodiment, controller would monitor the state of the line (i.e. whether the handset of telephone E 1201 was onhook or offhook) and when it was onhook (i.e. no call was in progress) it could then initiate the call setup routing as described above in relation to steps 1417 to 1429 of FIG. 14. Acknowledgement messages could be sent to the user at various stages of the process to alert him to the fact that the line was busy but that call setup would be initiated as soon as the line became free.

Although in the above described embodiments, communication sessions were established between telephones, in alternative embodiments, one or more telephones could be replaced by other communication terminals such as a computer connected to the internet via an 'always-on' data connection (e.g. an ADSL broadband connection) and running a telephony software package such as "BT Communicator" available from British Telecommunications plc.

Moreover, although in the above described embodiments the communication sessions that were established were voice telephone calls, in alternative embodiments the communication sessions could comprise multimedia communication sessions such as video calls. In such embodiments, the caller and callee identification data could comprise SIP addresses (or other forms of identifier) instead of telephone numbers. Also, the communications terminals in such embodiments may comprise, for example, video telephones or computers as described above.

In the above described embodiments, the data identifying the callee was found in a contacts database on the mobile telephone. In alternative embodiments, the user could select a callee from any source easily accessible from the mobile terminal. For example, from a WAP (wireless application protocol) or HTML page displayed on the terminal or from a contacts database that is resident in the communications network but accessed from the mobile terminal. It is also possible for the data to be sent to the mobile terminal via an SMS or MMS message.

Although in the above described embodiments a mobile telephone handset was described, in alternative embodiments it could be replaced by other forms of mobile communications terminal, such as a GSM/GPRS enabled personal digital assistant like the Treo™ 650 available from PalmOne™, Inc., USA.

Although in the above described embodiments, a communications session was established between a caller terminal and a callee terminal, it is also possible to establish a communications system between a caller terminal and more than one callee terminal, like when setting up a conference call. In such embodiments, the user could identify more than one callee using the mobile terminal before transmitting a session setup request, thus establishing a communications session with multiple callees at one time. Alternatively, the user could establish a first session with a first callee and then establish subsequent sessions with more callees.

In alternative embodiments, the user may have registered the mobile handset and one or more caller telephones but may want to use the service in another location with an unregistered caller telephone. For example, the user may be at a friend's house/office or at the office of a customer/partner. In such embodiments, the user would have already registered their mobile handset and at least one caller telephone (hereinafter called a home caller telephone) with the Click2call service. The home caller telephone is the caller telephone associated with an account that is billed when the user establishes telephone calls from their mobile handset. The 'owner' of the third party caller telephone (hereinafter visitor caller telephone) would have also registered a caller telephone with the Click2call service and now wishes to enable someone else (i.e. the user) to use Click2call service on the visitor caller telephone (perhaps for only a limited, predetermined period of time).

In certain embodiments, upon registering the visitor caller telephone, the 'owner' of the visitor caller telephone would be sent an access code (e.g. a four digit PIN number) which he can give to the user. A mapping between the access code and an identifier of the visitor caller terminal (e.g. telephone number) is created and stored in the network. To establish a call, the user would identify the contact they wish to call using their mobile handset, enter the telephone number associated with the visitor caller terminal and enter the access code. This information is sent to the Click2call server, which validates the access code against the identifier of the visitor caller telephone and requests call setup with billing applied to the account associated with the home caller telephone.

Alternatively, the 'owner' could dial a short code followed by an identifier of the user's mobile telephone (e.g. the MSISDN number (telephone number)). A mapping between the identifier of the mobile handset and an identifier of the visitor caller telephone (e.g. telephone number) is created and stored in the network. To establish a call, the user would identify the contact they wish to call using their mobile handset and enter the telephone number associated with the visitor caller terminal. This information is sent to the Click2call server, which validates the identifier of the mobile handset against the identifier of the visitor caller telephone and requests call setup with billing applied to the account associated with the home caller telephone.

Alternatively, the 'owner' may have a wireless access point as described above in relation to the fifth or sixth embodiments, in which case an identifier of the access point (e.g. IP address) can be used to validate the request.

The invention claimed is:

1. A method of establishing a communications session in a communications system, said communications system comprising a first caller terminal, a further caller terminal, a mobile terminal associated with said first caller terminal and with said further caller terminal, a callee terminal associated with a callee, and session initiation means, said method comprising:
  (i) associating said first caller terminal with said mobile terminal by storing, in a network based registration database, a first mapping between data identifying said mobile terminal and data identifying said first caller terminal;
  (ii) associating said further caller terminal with said mobile terminal by storing, in a network based registration database, a further mapping between data identifying said mobile terminal and data identifying said further caller terminal;
  (iii) identifying said callee using said mobile terminal;
  (iv) responsive to identification of said callee, transferring data identifying said callee from said mobile terminal to said session initiation means; and
  (v) in dependence on said transferred data, operating said session initiation means to establish a communications session between a selected caller terminal being said first caller terminal or said further caller terminal selected in dependence on the location of said mobile terminal, and said callee terminal, by establishing a first leg of said communications session with said selected caller terminal, establishing a second leg of said communications session with said callee terminal, and connecting said first and second legs together.

2. A method according to claim 1, wherein said session initiation means is local to said first caller terminal and/or said further caller terminal.

3. A method according to claim 1, wherein said session initiation means is remote to said first caller terminal and/or said further caller terminal.

4. A method according to claim 1, wherein said transferring step comprises transferring said data to said session initiation means initially via a wireless network.

5. A method according to claim 1, wherein said transferring step comprises:
transferring said data from said mobile terminal to said session initiation means via an intermediate device local to said mobile terminal and connected to an internet, wherein
said data is transferred via a wireless network between said mobile terminal and said intermediate device and via said internet between said intermediate device and said session initiation means.

6. A method according to claim 1, further comprising:
associating a further caller terminal with said mobile terminal, said further caller terminal itself being associated with different identification data to said caller terminal;
operating said session initiation means to establish a communications session between one of said caller terminals and said callee terminal in dependence on the location of said mobile terminal.

7. A method according to claim 6, wherein said further caller terminal is at a location remote to said caller terminal.

8. A method according to claim 1, wherein data relating to said first caller terminal and/or said further caller terminal is additionally transferred in said transferring step.

9. A method according to claim 1, wherein said first caller terminal and/or said further caller terminal comprises a home caller terminal, wherein said communications system further comprises a visitor caller terminal, wherein said transferring step further comprises transferring data identifying said visitor caller terminal from said mobile terminal to said session initiation means, wherein said operating step comprises operating said session initiation means to establish said communications session between said visitor caller terminal and said callee terminal, and wherein billing for said communications session is applied to an account associated with said home caller terminal.

10. A method according to claim 1, wherein
said further caller terminal is at a location remote to said first caller terminal.

11. A communication session initiation apparatus for establishing a communications session in a communications system, said communications system comprising a first caller terminal, a further caller terminal, and characterized in that it further comprises a mobile terminal associated with said first caller terminal and said further caller terminal, and a callee terminal associated with a callee, said apparatus comprising:
a data receiver arranged in operation to receive from said mobile terminal, data relating to said callee; and
a session establishment server arranged to be responsive to said received data, and in operation to establish a communications session in dependence on said received data, between said first caller terminal or said further caller terminal selected in dependence on location of said mobile terminal, and said callee terminal, by establishing a first leg of said communications session with said selected caller terminal, establishing a second leg of said communications session with said callee terminal, and connecting said first and second legs together.

12. The communication session initiation apparatus according to claim 11, wherein
data from said mobile terminal is received by said session establishment server via an intermediate device local to said mobile terminal and connected to an internet, wherein
said data is transferred via a wireless network between said mobile terminal and said intermediate device and via said internet between said intermediate device and said session establishment server.

13. The communication session initiation apparatus according to claim 11, wherein
a further caller terminal is associated with said mobile terminal, said further caller terminal itself being associated with different identification data to said caller terminal;
said session establishment server is operated to establish a communications session between one of said caller terminals and said callee terminal in dependence on the location of said mobile terminal.

14. The communication session initiation apparatus according to claim 11, wherein
said first caller terminal and/or further caller terminal comprises a home caller terminal, said communications system further comprises a visitor caller terminal, wherein
data identifying said visitor caller terminal is transferred from said mobile terminal to said session establishment server, wherein
said session establishment server is operated to establish said communications session between said visitor caller terminal and said callee terminal, and wherein
billing for said communications session is applied to an account associated with said home caller terminal.

* * * * *